United States Patent [19]

Kelch

[11] Patent Number: 5,000,992

[45] Date of Patent: Mar. 19, 1991

[54] COEXTRUDED MULTILAYER FOAMED FILM FOR PLASTIC CONTAINER CLOSURES AND PROCESS FOR MANUFACTURE

[75] Inventor: Robert H. Kelch, Granville, Ohio

[73] Assignee: The Dow Chemical Company, Midland, Mich.

[21] Appl. No.: 359,826

[22] Filed: Jun. 1, 1989

[51] Int. Cl.$^5$ .................. B65D 53/04; B32B 3/26
[52] U.S. Cl. .................. 428/36.5; 215/224; 215/243; 215/347; 215/348; 428/318.6; 428/319.9; 428/213; 428/220; 428/458; 428/516
[58] Field of Search ............... 428/36.5, 318.6, 318.8, 428/319.9, 213, 220, 516, 458; 215/347, 348, 224, 243

[56] References Cited

U.S. PATENT DOCUMENTS

| | | | |
|---|---|---|---|
| 3,553,070 | 1/1971 | Sparks | 161/160 |
| 3,557,265 | 1/1971 | Chisholm | 264/47 |
| 3,645,837 | 2/1972 | Chisholm | 264/171 |
| 3,819,460 | 6/1974 | Dukess | 215/40 |
| 3,824,139 | 7/1974 | Ware | 156/79 |
| 4,022,858 | 5/1977 | Cavanna | 264/51 |
| 4,038,446 | 7/1977 | Rhoads | 428/515 |
| 4,107,247 | 8/1978 | Dukess | 428/315 |
| 4,183,435 | 1/1980 | Thompson | 428/322 |
| 4,206,165 | 6/1980 | Dukess | 428/315 |
| 4,522,675 | 6/1985 | Sharps | 156/244.11 |
| 4,533,578 | 8/1985 | Boyd | 428/319.9 |
| 4,576,860 | 3/1986 | Fink | 428/314.4 |
| 4,657,811 | 4/1987 | Boyd | 428/319.9 |
| 4,716,069 | 12/1981 | Burke | 428/319.9 |
| 4,721,643 | 1/1988 | Harayama | 428/319.9 |
| 4,818,577 | 4/1989 | Ou-Yang | 428/365 |
| 4,846,362 | 7/1989 | Schloss | 215/349 |
| 4,866,100 | 9/1989 | Johnston et al. | 521/91 |

FOREIGN PATENT DOCUMENTS

| | | |
|---|---|---|
| 995428 | 8/1976 | Canada . |
| 61894 | 7/1982 | Canada . |
| 237977 | 9/1987 | European Pat. Off. . |
| 287826 | 10/1988 | European Pat. Off. . |
| 3722139 | 1/1989 | Fed. Rep. of Germany . |
| 54-148864 | 11/1979 | Japan . |
| 57-020345 | 2/1982 | Japan . |
| 58-145441 | 8/1983 | Japan . |
| 58-222839 | 12/1983 | Japan . |
| 59-009030 | 1/1984 | Japan . |
| 59-029151 | 2/1984 | Japan . |
| 61-016853 | 1/1986 | Japan . |
| 61-035941 | 2/1986 | Japan . |

OTHER PUBLICATIONS

"All You Need to Know About Cap Liners", Tri-Seal International Inc. brochure.

Primary Examiner—James Seidleck

[57] ABSTRACT

A plastic container closure, such as a bottle cap liner or tamper evident seal, is formed from a coextruded multilayer foamed film. The coextruded multilayer foamed film has at least one solid film layer of a first polyolefin blend containing linear low density polyethylene, low density polyethylene, and, optionally high density polyethylene, and at least one foamed layer of a second polyolefin blend containing linear low density polyethylene, low density polyethylene, and optionally ethylene vinyl acetate. The multilayer foamed film may be coextruded using a blown film or cast film extrusion process under defined conditions. the coextruded multilayer foamed film may be laminated to other materials such as polyester film, thermoplastic adhesive films or metallic films and used as a plastic container closure, or may be applied as a liner to a plastic bottle cap.

17 Claims, No Drawings

COEXTRUDED MULTILAYER FOAMED FILM FOR PLASTIC CONTAINER CLOSURES AND PROCESS FOR MANUFACTURE

BACKGROUND OF THE INVENTION

The present invention relates to plastic container closures, such as bottle cap liners and tamper evident seals, formed from a coextruded multilayer foamed film, to coextruded multilayer foamed films which are useful for plastic container closures, and to a method for coextruding such multilayer foamed films.

In a number of industries tamper evident seals are applied over plastic container openings for security purposes. Because of the container contents some of those industries also require that the seal keep liquid contents from leaking from the container, and/or keep air and contaminants from invading the container, and yet be easily removable. Industries having these requirements include the milk, orange juice, and motor oil industry. Common paper, foil, and paper-foil seals are often inadequate for use in those industries since they do not afford the quality of seal desired and since they are not easily applied by induction or high frequency sealing equipment.

Likewise, such seals are often inadequate when used as liners for threaded and snap-on bottle caps. In those instances a greater degree of compression is needed in the liner than is commonly found in paper, foil, and paper-foil seals.

Accordingly, other forms of plastic container closures have been developed. For example, it is known to use a single layer of a 5-10 mil thick closed-cell high density polyethylene (HDPE) foam film. However, such single foam layers are fragile, do not possess sufficient sealing properties for many uses and must be laminated to a metal foil and/or polyester film prior to being applied to the plastic container. Even then a number of disadvantages remain.

It has recently been suggested that a layer of compressible polyolefin foam may be adhered to a solid polymeric film to produce a liner suitable for a bottle cap. Thus in U.S. Pat. No. 4,818,577, assigned to Minnesota Mining and Manufacturing Co., there is disclosed a bottle cap liner which has a layer of compressible polyolefin foam, a layer of adhesive, and a layer of polymeric film such as polyester, silicone, polytetrafluoroethylene, and polyimide film. While such a multilayer foam/film is an improvement over a single foam layer, problems exist in the lamination process and still, as mentioned above, a number of disadvantages remain with laminated materials.

Finally, it is also known to use coextruded multilayer foamed films as plastic container closures. Thus, Tri-Seal International, Inc. of Blauvelt, N.Y. has recently introduced its Tri-Seal F-828 liners which are a 20-60 mil thick three-ply coextruded foamed polypropylene core between two facings of solid polypropylene. The solid polypropylene film facings are said to protect the container contents from penetration and evaporation while the foamed plastic core is said to be resilient, compressible, and resistant to foam collapse. The Tri-Seal F-828 liners are also said to be capable of radially expanding under pressure should they be used with plastic or metal bottle caps. Still, because of their relative thickness, applicability is limited. U.S. Pat. Nos. 4,107,247 and 4,206,165 assigned to Tri-Seal International, are believed to cover the method of coextruding such multilayer foamed film liners.

Other methods for coextruding multilayer foamed films are also known. For example, U.S. Pat. No. 3,557,265, assigned to the assignee of the present invention, discloses a method of extruding laminates whereby optionally alternating foamed and unfoamed layers may be obtained. See also U.S. Pat. Nos. 4,022,858 and 3,553,070, assigned to Mobil. More recently, U.S. Pat. Nos. 4,533,578 and 4,657,811 to Mobil disclose coextrusion methods for producing a relatively thin three-layer polyolefin film having a foamed middle layer. The coextruded multilayer foamed film is adapted for use in high performance polyolefin trash bags. The outer facing layers are linear low density polyethylene (LLDPE) or high density polyethylene (HDPE) and the foam core is a low density polyethylene (LDPE). Finally Published German Patent Application DE No. 3722139 dated Jan. 19, 1989, assigned to Stoll Kunststoffe, discloses producing a thermoplastic foamed film particularly for carrier bags and packaging bags by coextruding at least two layers (which may be polyolefin), one containing a blowing agent and one containing no blowing agent. The final thickness of the individual layers is 6-18, and preferably about 12, microns. There is no suggestion in these later patents that such foamed films could be used as plastic container closures, nor as a practical matter could they be effectively so used.

Thus while considerable technology exists in the foamed film area, to date it has not yet been possible to produce a plastic container closure which satisfies all of the needs of the industries which package their contents in plastic containers (bottles, jars, and jugs). In particular, the need exists for a relatively thin (less than about 10 mils total thickness) multilayer foamed film which has at least one solid layer for overall strength and barrier resistance and a foamed layer which is as strong as possible while still having the desired degree of resilience and compressibility such that it can be used for a plastic container closure. The need also exists for an effective method of producing such multilayer foamed films.

SUMMARY OF THE INVENTION

That need is met by the present invention which provides an efficient method of coextruding a 3-10 mil thick multilayer foamed film which can be used for plastic container closures, a unique coextruded multilayer foamed film, and plastic container closures formed from that coextruded multilayer foamed film.

The plastic container closures of the present invention can be formed from the thin, coextruded multilayer foamed film. Preferably the plastic container closure is in one of two forms. Thus, the plastic container closure of the present invention may be a laminate of the multilayer foamed film adhered to an additional layer or layers such as a polyester film, thermoplastic adhesive film, metallic foil or all three so that the laminate is high frequency sealable over the opening of a plastic container. Alternative, the plastic container closure of the present invention may be formed from the multilayer foamed film (or laminate thereof) and a threaded or snap-on bottle cap where the multilayer foamed film (or laminate thereof) is attached to the bottle cap as a liner so that it can be compression or pressure applied to the opening of a plastic container.

The multilayer foamed film has at least one solid polyolefin film layer which is preferably a first polyolefin blend and at least one foamed polyolefin layer which is preferably a second polyolefin blend. The first polyolefin blend of the solid film layer contains linear low density polyethylene (LLDPE) and low density polyethylene (LDPE). The first polyolefin blend may also contain high density polyethylene (HDPE). The LLDPE gives the resultant solid polyolefin film layer strength, the HDPE modulus, and the LDPE better processing characteristics. Preferably the first polyolefin blend of the solid film layer contains about 20-90% LLDPE, 10-90% LDPE, and 0-90% HDPE, more preferably about 10-80% LLDPE, 10-60% LDPE, and 0-50% HDPE, and most preferably about 50% LLDPE, 20% LDPE and 30% HDPE. Additional materials such as inorganic fillers, pigments, antioxidants or UV stabilizers, fire retardants, etc. can be added.

Such additional materials can also be added to the second polyolefin blend of the foamed layer. The second polyolefin blend also contains LLDPE and LDPE. Again the LLDPE improves the physical properties and strength characteristics and the LDPE acts as a melt processing aid to assist in the extrusion process and works to maintain melt strength. The second polyolefin blend of the foamed layer may also contain ethylene vinyl acetate (EVA) which improves melt strength and tear resistance. Optionally, some HDPE may be included; although, that is generally to be avoided because the addition of HDPE in the foamed layer greatly decreases tear strength. Prior to extrusion processing the second polyolefin blend will also include a chemical blowing agent such as azodicarbonamide or sodium bicarbonate/citric acid. Preferably the second polyolefin blend prior to processing contains about 10-90% LLDPE, 10-90% LDPE, 0-50% EVA, 0-30% HDPE, and 0.1-1% blowing agent, more preferably about 40-75% LLDPE, 20-60% LDPE, 2-10% EVA, and 0.1-1% blowing agent, and most preferably about 60% LLDPE, 35% LDPE, 5% EVA, and 0.1-1% blowing agent. The blowing agent, of course, will form the primarily closed cell foam structure during the melt extrusion process and will not exist as such in the resulting foamed layer of the multilayer foamed film.

Preferably the coextruded multilayer foamed film is either a two-ply or a three-ply film. Coextrusion of a foamed polyolefin layer with at least one solid polyolefin film layer is needed in order to obtain overall composite strength. In a two-ply coextruded film preferably about 10-40% of the total film thickness will consist of the solid polyolefin film layer and about 90-60% will consist of the foamed polyolefin layer. In a three-ply coextruded film, there are preferably two outer solid polyolefin film layers which constitute about 5-20% of the film thickness and a middle foamed polyolefin layer which is about 90-60%. It is also possible to have a three-ply coextruded film with two outer foamed polyolefin layers and a middle solid polyolefin film layer.

It is, thus, possible to vary the arrangement and/or thicknesses of the respective layers and/or the respective polyolefin blends of the respective layers within the parameters given to produce a coextruded multilayer foamed film particularly suited to use for a plastic cotainer closure. By varying the LLDPE:HDPE ratio in the solid polyolefin film layer, desired strength and tear properties (LLDPE) versus modulus (HDPE) can be obtained. Likewise, by using large amounts of LLDPE in the foamed polyolefin layer maximum strength characteristics are obtained.

The method of coextrusion is also important in producing a multilayer foamed film particularly well suited for use for plastic container closures. Either a blown film (tubular bubble) or cast film (slot die) extrusion process may be used. But, in either instance, foam extrusion melt temperature control is important to control foam cell size. Small cells tend to give the strongest physical properties (tensile strength, tear strength, film ultimate elongation) while larger sized foam cells will deteriorate the film properties. Melt temperatures that are excessively high will cause large cell size formation (and result poor physical properties). Conversely, foam layer melt temperature that are too low will not completely activate the chemical blowing agent and will result in incomplete foam expansion and die-lip buildup of solid blowing agent residue. Preferably the extrusion temperature is approximately 400°-450° F.

The size of the die gap is also important. A large die gap will result in low extrusion back pressure and will allow for premature foaming. This will result in poor foam properties, generally caused by large cell size and the presence of open cells. Decreasing of the die gap will result in an increase in extrusion pressure which will keep the blowing agent in solution in the polymer melt. The resulting foam exhibits desired small sized, closed cell foam, which provides for the strongest physical properties. Preferably the die gap is less than about 50 mils and most preferably is about 20-40 mils.

The result is a multilayer foamed film having properties which make it particularly well suited for a plastic container closure. A key is that the resulting foamed polyolefin layer has an average cell size of less than 0.6 millimeters in length and most often less than 0.4 millimeters in length. An average cell size of less than 0.6 millimeters in length is desirable in that above that size, the foamed polyolefin layer has insufficient tensile strength, tear strength, and impact strength to provide a multilayer foamed film usable for plastic container closures. Thus, with an average cell size of less than 0.6 millimeters in length the foamed polyolefin layer (and resulting multilayer foamed film) is capable of forming on adequate compression seal when used as a liner for a threaded or snap-on bottle cap.

The multilayer foamed film may also be laminated to aluminum foil, polyester film and/or thermoplastic adhesive film, and then thermally sealed to the mouth of liquid containing plastic bottles (milk jugs, juice bottles, engine oil bottles, cleaning agent bottles, etc.) to prevent the liquid contents from spilling out during initial transportation and storage and to provide a safety tamper evident seal on a bottle. In this alternate form, the preferred configuration is a multilayer foamed film having a polyester film (preferably a polyethylene terephthalate film) and a metallic foil joined to one surface of the multilayer foamed film with a thermoplastic or thermosetting adhesive (including aqueous or solvent based adhesives) and, most preferably, also having a polyester film joined to the other surface with a similar adhesive. The metallic foil, which is preferably on aluminum foil, may have a Surlyn overcoat for protection purposes.

Accordingly, it is an object of the present invention to provide a new and improved plastic container closure, a unique coextruded multilayer foamed film which is particularly useful for a plastic container closure, and a novel method of coextruding such a multilayer foamed film. These and other objects and advantages of the invention will be apparent from the following detailed description of the invention and the appended claims.

DETAILED DESCRIPTION OF THE INVENTION

Preferably the coextruded multilayer foamed film of the present invention is a two ply one, having one solid polyolefin film layer and one foamed polyolefin layer, or a three ply one which preferably has two outer solid polyolefin film layers and a middle foamed polyolefin layer, although, it may have two outer foamed polyolefin layers and a middle solid polyolefin film layer.

The preferred composition of the foamed polyolefin layer is a blend of LLDPE, LDPE and optionally EVA. The solid polyolefin film layer contains LLDPE and LDPE, and optionally HDPE. The foamed polyolefin layer has small closed cells having an average cell size of less than 0.6 millimeters in length and preferably less than 0.4 millimeters in length. Such a foamed polyolefin layer can be created with the method of the present invention by use of a solid chemical blowing agent which decomposes at prescribed extrusion temperatures liberating gases which expand the molten polymer.

The use of solid chemical blowing agents (rather than physical blowing agents such as chlorofluorocarbons or other direct injection of gases) permit the present multilayered foamed films to be made on conventional film production equipment. In practice, it has been found that sodium bicarbonate/citric acid blend chemical blowing agents (available as Hydrocerol from Boehringer Ingelheim, distributed by Henley Chemicals, Inc. or as a concentrate in LDPE from Quantum/USI) give smaller cell size than, for example, azodicarbonamide chemical blowing agents. Thus, the preferred blowing agent for the disclosed foamed film utilizes Hydrocerol-based blowing agent concentrates although others such as azodicarbonamide, 5-phenyl tetrazole, sodium borohydride, sulfonyl hydrazides, etc. may be used.

The multilayered foamed film of the present invention will have a density or specific gravity less than that of the base polymer or that of a comparable solid film. Coextruded two-ply and three-ply foamed films with densities of 0.65–0.80 g/cm$^3$ are possible. The density of a typical solid polyethylene film would be approximately 0.92 g/cm$^3$.

Both the two-ply and three-ply version of the instant coextruded multilayer foamed film can be produced either by known blown film (tubular bubble) or cast film (slot die) extrusion processes. As stated earlier, foam extrusion temperature is important in determining foam cell size (and thus the resulting properties). The sodium bicarbonate/citric acid chemical blowing agent preferentially used decomposes between 320°–400° F. Therefore, extrusion melt temperatures of at least 400° F. must be experienced by the foam layer. Temperatures above 460° F., however, have been found to create large foam cells, which is detrimental to physical properties. Accordingly the preferred temperature range is approximately 400°–450° F.

As also stated earlier, die gap is also an important equipment parameter for determining cell size. It has been found that when coextruding a multilayered foamed film on a 6" diameter blown film line, a 80 mil die gap produced very large cells, while a 40 mil die gap yielded foam with small cells. A production plant trial on an 18" diameter die with a 55 mil gap yielded unacceptably large celled foam. After changing the die gap to 40 mils, good quality foam was made. Another production plant blown film trial on an 18" diameter die with 27 mil die gap yielded good quality (small cell size) 6.5 mil coextruded two-ply foamed film. It is thus preferred to run on a small die gap blown film line. Dies with 27 and 40 mils are known to produce small cell size foam. Dies with 55 and 80 mil die gaps have been found to produce excessively large cells. Accordingly a die gap of less than about 50 mils and desirably between 20 and 40 mils is preferred.

EXAMPLE 1

A two-ply coextruded multilayer foamed film was made on a blown film line. The solid layer composition and foam layer composition are provided below.

| Solid Layer | Foam Layer |
| --- | --- |
| 60% DOWLEX LLDPE 2045 (1) | 60% DOWLEX LLDPE 2045 (1) |
| 30% Dow HDPE 61513.01 (1) | 35% Dow LLDPE 681 (1) |
| 10% Dow LDPE 681 (1) | 5% DuPont Elvax 3190 EVA (3) |
| 10 phr Ampacet 11560 White (2) | 4 phr Spectratech FM 1764L (4) |

(1) Available from The Dow Chemical Company, Midland, Michigan, assignee of the present invention.
(2) A titanium dioxide pigment available from Ampacet Corp., Mt. Vernon, NY.
(3) Available from E.I. DuPont de Nemours, Wilmington, Delaware.
(4) The foam concentrate, Spectratech FM1764L, which is a 10% Hydrocerol (sodium bicarbonate/citric acid blend) blowing agent in LDPE concentrate manufactured by Quantum/USI, was utilized at four parts per hundred parts of resin (phr).

The coextruded film was extruded with a 30% solid layer (30% solid layer of total film gauge) at a total gauge of 6.5 mils. Extrusion conditions for the Egan 2½" 24:1 L/D extruder (foam layer), Egan 1½" 24:1 L/D extruder (solid layer) and Uniflo 6" diameter die with 40 mil die gap are given:

|  | Solid Layer Extruder | Foam Layer Extruder | Die |
| --- | --- | --- | --- |
| Screw Speed (rpm) | 140 | 40 | All die zones (°F.) 380 |
| Pressure (psig) | 3700 | 4800 | Die lip zone (°F.) 400 |
| Barrel Zone 1 (°F.) | 340 | 340 |  |
| Barrel Zone 2 (°F.) | 370 | 390 |  |
| Barrel Zone 2 (°F.) | 400 | 410 |  |
| Adapter Zone (°F.) | 400 | 410 |  |
| Transfer Line (° F) | 400 | 410 |  |
| Polymer Melt Temp (°F.) | 445 | 448 |  |
| Line Speed (fpm) | 17 |  |  |

The physical properties of the 6.5 mil 2-layer foam film are shown below for the machine direction (MD) and transverse direction (TD) orientations of the film.

|  | MD | TD |
| --- | --- | --- |
| Ultimate Tensile Strength (psi) | 2320 | 1480 |
| Ultimate Elongation (%) | 610 | 425 |
| 2% Secant Modulus (psi) | 23,600 | 25,200 |
| Elmendorf Tear Strength (g/mil) | 355 | 425 |
| Gull Wing Tear Strength (lb/in) | 535 | 540 |

The film had a 0.76 g/cm$^3$ overall specific gravity (density) and had an average MD cell length of 0.3 mm and a TD cell width of 0.2 mm.

EXAMPLE 2

A two-ply multilayer foamed film with a higher level of HDPE and lower LLDPE level in the skin layer and lower level of LLDPE in the foamed layer than that of Example 1 was made as a blown film using identical conditions as stated previously. The overall film modulus was higher (stiffer film) and the tensile strength slightly greater, but MD tear strength was significantly reduced over the film composition given above.

| Solid Layer | Foam Layer |
| --- | --- |
| 45% DOWLEX 2045 (1) | 50% DOWLEX 2045 (1) |
| 45% Dow HDPE 61513.01 (1) | 45% Dow LDPE 681 (1) |
| 10% Dow LDPE 681 (1) | 5% DuPont Elvax 3190 (3) |
| 10 phr Ampacet 11560 (2) | 4 phr FM 1764 (4) |

|  | MD | TD |
| --- | --- | --- |
| Ultimate Tensile Strength (psi) | 2510 | 1350 |
| Ultimate Elongation (%) | 630 | 430 |
| 2% Secant Modulus (psi) | 26,800 | 26,900 |
| Elmendorf Tear Strength (g/mil) | 250 | 400 |
| Gull Wing Tear Strength (lb/in) | 205 | 210 |

Film density = 0.76 g/cm$^3$; MD cell length = 0.3 mm
(1) Available from The Dow Chemical Company, Midland, Michigan, assignee of the present invention.
(2) A titanium dioxide pigment available from Ampacet Corp., Mt. Vernon, NY.
(3) Available from E.I. DuPont de Nemours, Wilmington, Delaware.
(4) The foam concentrate, Spectratech FM1764L, which is a 10% Hydroceral (sodium bicarbonate/citric acid blend) blowing agent in LDPE concentrate manufactured by Quantum/USI, was utilized at four parts per hundred parts of resin (phr).

EXAMPLE 3

A monolayer foam film was made on this 6" diameter blown film line (40 mil gap) using the same foam composition as used in Example 1. This trial was run to determine the physical properties of the foam by itself. Extrusion conditions were identical to those given in Example 1. A 4 mil monolayer foam was made to stimulate the approximately 4 mils of foam that are contained in the 6.5 mil coextruded structure (30% solid layer in 6.5 mils; therefore, 4.6 mils of foam, 1.9 mils of solid layer). In addition, a 6 mil monolayer foam film of the same composition was also made. To determine the physical properties of a solid layer, a 1.7 mil monolayer solid film with the same LLDPE-LDPE-EVA-TiO$_2$ composition as the solid layer of the coex film in Example 1 was also made via a blown film process under similar conditions as those given in Example 1.

Both monolayer foams exhibited very low MD tear strengths (less than 30 g/mil), low tensile strength (less than 1800 psi), and a low secant modulus (less than 15,000 psi). The monolayer solid film, on the other hand, exhibited significantly superior tensile strength and tear strength and a much higher 2% secant modulus than either of the foams. The 4 mil foam exhibited a 0.50 g/cm$^3$ density, the 6 mil had a 0.62 g/cm$^3$ density, and the solid film was based on a 0.96 g/cm$^3$ density. Thus, the solid layer of the coex foam film (such as in Example 1) does provide the major strength characteristics of the composites, while the foam decreases the overall coex film density.

| | MD FILM PROPERTIES | | |
| --- | --- | --- | --- |
| | 4 MIL FOAM | 6 MIL FOAM | 1.7 MIL SOLID FILM |
| Ultimate Tensile Strength (psi) | 1410 | 1720 | 3740 |
| Ultimate Elongation (%) | 395 | 500 | 580 |
| 2% Secant Modulus (psi) | 12,400 | 14,700 | 38,200 |
| Elmendorf Tear Strength (g/mil) | 15 | 30 | 170 |
| Film Density (g/cm$^3$) | 0.50 | 0.62 | 0.96 |

| | MD FILM PROPERTIES | | |
| --- | --- | --- | --- |
| | 4 MIL FOAM | 6 MIL FOAM | 1.7 MIL SOLID FILM |
| MD Cell Length (mm) | 0.6–0.8 | 0.5 | — |

EXAMPLE 4

A series of three-ply coextruded multilayer foamed films (solid skins, foam core) were made to determine the effect of low and high ratios of LLDPE-HDPE in the skin and low and high ratios of LLDPE:LDPE in the foam core. The three-ply films were made on a 3-layer blown coextrusion film linen with 6" diameter die and 40 mil die gap. Extrusion conditions are similar to those given previously. The three-ply films were 6 mils in gauge and exhibited constant overall densities of approximately 0.72 g/cm$^3$.

| | Solid Skin Layers (A) | Foam Core Layer (B) |
| --- | --- | --- |
| Film 4a | 70% HDPE 07065 (1) | 50% LLDPE 2045 (1) |
| | 20% LLDPE 2045 (1) | 45% LDPE 132 (1) |
| | 10% LDPE 681 (1) | 5% EVA 3190 (3) |
| | | 4 phr FM 1764L (4) |
| Film 4b | 20% HDPE 07065 (1) | Same as 4a(B) |
| | 70% LLDPE 2045 (1) | |
| | 10% LDPE 681 (1) | |
| Film 4c | 45% HDPE 07065 (1) | 20% LLDPE 2045 (1) |
| | 45% LLDPE 2045 (1) | 75% LDPE 132 (1) |
| | 10% LDPE 681 (1) | 5% EVA 3190 (3) |
| | | 4 phr FM 1764L (4) |
| Film 4d | Same as 4c(A) | 75% LLDPE 2045 (1) |
| | | 20% LDPE 132 (1) |
| | | 5% EVA 3190 (3) |
| | | 4 phr FM 1764L (4) |

(1) Available from The Dow Chemical Company, Midland, Michigan, assignee of the present invention.
(3) Available from E.I. DuPont de Nemours, Wilmington, Delaware.
(4) The foam concentrate, Spectratech FM1764L, which is a 10% Hydroceral (sodium bicarbonate/citric acid blend) blowing agent in LDPE concentrate manufactured by Quantum/USI, was utilized at four parts per hundred parts of resin (phr).

Physical properties for these films are shown below:

| | MD Film Physical Properties | | | |
| --- | --- | --- | --- | --- |
| | 4a | 4b | 4c | 4d |
| Ultimate Tensile Strength (psi) | 2385 | 2285 | 2370 | 2190 |
| Ultimate Elongation (%) | 570 | 565 | 555 | 595 |
| 2% Secant Modulus (psi) | 36,400 | 23,900 | 27,000 | 29,300 |
| Elmendorf Tear Strength (g/mil) | 35 | 195 | 60 | 175 |

Thus, the three-ply film with high level of HDPE in the skin layer (4a) had a higher modulus, but lower tear strength than the film with a high level of LLDPE (and low HDPE level) (4b). The film with the highest LLDPE level in the foam core (4d) had a higher tear strength than the film with the higher ratio of LDPE (4c). The film modulus of the two films which had a constant skin composition (4c and 4c) maintained a relatively constant secant modulus. The two films in which the skin HDPE:LLDPE ratio was varied (4a and 4b) showed a dramatic change in modulus with respect to HDPE level.

EXAMPLE 5

A three-ply 5.7 mil multilayer foamed film was made using a cast film (slot die) extrusion (40 mil gap) onto a chilled roll. Extrusion conditions and resulting film properties are given below:

| Skin Layer (A) | Foam Layer (B) |
|---|---|
| 40% LLDPE 2045 (1) | 65% LDPE 681 (1) |
| 40% HDPE 61513.01 (1) | 30% LLDPE 2045 (1) |
| 20% LDPE 681 (1) | 5% EVA 3190 (3) |
| | 2 phr FM 1570H (5) |

| | Skin Extruder | Foam Extruder |
|---|---|---|
| Screw Speed (rpm) | 40 | 80 |
| Pressure (psig) | 3900 | 2900 |
| Barrel Zone 1 (°F.) | 340 | 330 |
| Barrel Zone 2 (°F.) | 360 | 375 |
| Barrel Zone 3 (°F.) | 390 | 420 |
| Adapter Zone (°F.) | 390 | 410 |
| Transfer Line (°F.) | 390 | 410 |
| Melt Temp (°F.) | 390 | 413 |
| All Die Zones (°F.) | 390 | |
| Cast Roll Temp (°F.) | 90 | |
| Chill Roll Temp (°F.) | 80 | |
| Line Speed (fpm) | 18 | |

| | MD | TD |
|---|---|---|
| Ultimate Tensile Strength (psi) | 2100 | 950 |
| Ultimate Elongation (%) | 515 | 220 |
| 2% Secant Modulus (psi) | 18,400 | 18,700 |
| Elmendorf Tear Strength (g/mil) | 25 | 310 |

(1) Available from The Dow Chemical Company, Midland, Michigan, assignee of the present invention.
(3) Available from E.I. DuPont de Nemours, Wilmington, Delaware
(5) A foam concentrate Spectratech FM 1570H, a 50% Hydrocerol (sodium bicarbonate/citric acid blend) blowing agent in LDPE concentrate manufactured by Quantum/USI, was utilized at two parts per hundred parts of resin (phr).

Small foam cell size was obtained from the 40 mil gap of the cast film die. Overall, the film exhibits much lower strength and physical properties than blown films with fairly similar composition. The cast film process imparts only mono-directional orientation to the film rather than bi-directional orientation which occurs with a blown or tubular film process. As a result, the physical properties of a cast film are much more unbalanced (MD vs. TD) than those of a blown film.

EXAMPLE 6

Several different foam compositions were made into monolayer foamed films at different extruder melt temperatures to determine the effect on foam film properties. Film melt extrusion temperatures of 415, 440, 470, and 500 were utilized. A 100% LDPE foam and two different 60% LLDPE/35% LDPE/5% EVA foams were evaluated on a blown film line with a 24:1 L/D 1" extruder and a 1¼" diameter die with a 35 mil die gap. Extruder zone temperatures were varied to achieve desired melt temperatures. Other process conditions (extrusion rate, linespeed, film blow-up ratio) were maintained constant.

Increasing melt temperatures caused a dramatic increase in foam cell size, which resulted in decreasing foam density. Higher melt temperatures decrease the polymer melt strength and increase the blowing agent gas pressure-volume, both of which result in larger cell sizes, which in turn causes a reduction in foam density. Foam film physical properties (tensile strength, ultimate elongation, tear strength, and impact strength) were found to significantly decrease in correspondence with the increasing cell size. Foams made at 415° F. melt temperature had the smallest cell size, highest foam density and strongest physical properties. Increasing the foam melt temperature from 415° F. to 440° F. resulted in 40–75% reductions in all physical properties, 19–33% reduction in foam density, and 130–260% increase in foam cell size (MD length).

| Film A: | 100 LDPE 681 |
|---|---|
| Film B: | 60% LLDPE 4047 |
| | 35% LDPE 681 |
| | 5% EVA 3190 |
| Film C: | 60% LLDPE 2045A |
| | 35% LDPE 681 |
| | 5% EVA 3190 |

Note: All foam layer composition also contained 4 phr of Spectratech FM1764L foam concentrate.

| | | | | MD FILM PROPERTIES | | | |
|---|---|---|---|---|---|---|---|
| FILM | FOAM MELT TEMP (°F.) | AVG. MD CELL LENGTH (mm) | FOAM DENSITY (g/cm³) | ULT. TENSILE STR. (psi) | ULT. ELONG. (%) | ELM. TEAR STR. (g/mil) | SPENCER IMPACT (g/mil) |
| A (SOLID) | 400 | 0 | 0.92 | 3110 | 430 | 50 | 370 |
| A | 415 | 0.18 | 0.68 | 1500 | 315 | 55 | 199 |
| A | 440 | 0.55 | 0.55 | 910 | 240 | 26 | 128 |
| A | 470 | 0.88 | 0.46 | 780 | 235 | 23 | 103 |
| A | 500 | 1.75 | — | 355 | 170 | 22 | 54 |
| B (SOLID) | 400 | 0 | 0.92 | 4600 | 730 | 261 | 405 |
| B | 415 | 0.35 | 0.71 | 1650 | 480 | 280 | 221 |
| B | 440 | 0.80 | 0.48 | 900 | 370 | 114 | 139 |
| B | 470 | 0.90 | 0.43 | 475 | 340 | 50 | 98 |
| B | 500 | 2.50 | — | 210 | 345 | 37 | 54 |
| C (SOLID) | 400 | 0 | 0.92 | 4500 | 645 | 254 | 478 |
| C | 415 | 0.25 | 0.61 | 1200 | 385 | 278 | 193 |
| C | 440 | 0.90 | 0.41 | 450 | 305 | 69 | 110 |
| C | 470 | 1.30 | 0.39 | 610 | 300 | 60 | 112 |
| C | 500 | 2.50 | — | 340 | 310 | 41 | 102 |

As can be seen from the temperature vs. property data, machine direction (MD) cell lengths of less than about 0.6 mm, and preferably less than 0.4 mm, are needed in order to obtain adequate physical properties of a foam film. Although not cited in the above example, transverse (TD) cell widths were always equal to or slightly smaller than the MD length, such that the MD length/TD width ratio was found to be generally 1.0–1.4. In both blown tubular and cast flat film processes, the film is predominantly being oriented in the MD direction, so MD cell length is expected to be greater than the TD width.

EXAMPLE 7

Two polyethylene foam compositions were made into blown monolayer films at different extruder melt temperatures and utilizing different blown film die gaps. A 24:1 L/D 1" extruder with a 1¼" diameter blown film die (different from that used in Example 6) was constructed with varying diameter inner die mandrels such that four different die gaps (25, 35, 52 and 78 mil) could be obtained. Extruder zone temperatures were adjusted so as to obtain extrusion melt temperatures of 415°, 440°, 470° and 500° F. All process conditions (extrusion rate, linespeed, film blow-up ratio) were maintained constant; only die configuration (die gap) and zone temperatures (melt temperature) were varied. Resin blends utilized were a 100% LDPE and a 40% LLDPE - 55% LDPE - 5% EVA, both with 4 phr of Spectratech FM1764L foam concentrate.

| Film A: | 100% LDPE 681 |
|---|---|
| Film B: | 55% LDPE 681 |
|  | 40% LLDPE 2045A |
|  | 5% EVA 3190 | slightly greater properties than does film made with the 25 mil gap die. When MD Elmendorf tear strength is evaluated, the 25 mil gap produced film is generally slightly stronger. Both die gaps, however, yield foamed film with superior physical properties and smaller cell size than does the 52 or 78 mil gap dies. Thus, for optimum properties (small cell size, greatest tensile strength, tear strength and ultimate elongation), dies with a 25-35 mil die gap are preferred over larger die gap dies (such as 52 or 78 mil).

When comparing the physical properties of the LDPE foam film "A" with that of the LLDPE containing foam "B", the superior strength properties of the LLDPE containing blend can be readily evidenced by the significantly greater Elmendorf tear strength values of the LLDPE blend foam. Increasing the level of LLDPE in the blend will increase the foam film strength characteristics (assuming that cell size can be kept to a minimum, preferably below 0.4 mm in MD length).

| Film | Die Gap (mil) | Foam Melt Temp. (°F.) | Ultimate Tensile Strength (psi) | Ult. Elong. (%) | Elmen. Tear Strgth. (g/mil) | Avg. MD Cell Length (mm) | Note |
|---|---|---|---|---|---|---|---|
| A | 25 | 415 | 1130 | 270 | 75 | 0.2 | |
| A | 25 | 440 | 1040 | 240 | 73 | 0.3 | |
| A | 25 | 470 | 815 | 215 | 37 | 0.4 | |
| A | 25 | 500 | 515 | 160 | 33 | 0.7 | |
| A | 35 | 415 | 1260 | 280 | 78 | 0.2 | |
| A | 35 | 440 | 1240 | 285 | 24 | 0.4 | |
| A | 35 | 470 | 845 | 250 | 16 | 0.5 | |
| A | 35 | 500 | 460 | 190 | 23 | 0.7 | |
| A | 52 | 415 | 1170 | 205 | 54 | 0.4 | |
| A | 52 | 440 | 660 | 185 | 31 | 0.6 | MF |
| A | 52 | 470 | 810 | 205 | 34 | 0.9 | MF, PDC |
| A | 52 | 500 | 550 | 160 | 27 | 1.0 | |
| A | 78 | 415 | 970 | 110 | 44 | 0.8 | MF |
| A | 78 | 440 | 660 | 135 | 30 | 1.7 | MF, PDC |
| A | 78 | 470 | 630 | 130 | 21 | 0.9 | MF |
| A | 78 | 500 | 465 | 185 | 17 | 1.2 | MF |
| B | 25 | 415 | 1315 | 385 | 193 | 0.3 | |
| B | 25 | 440 | 935 | 340 | 165 | 0.3 | |
| B | 25 | 470 | 465 | 290 | 91 | 0.7 | |
| B | 25 | 500 | 385 | 300 | 59 | 0.8 | |
| B | 35 | 415 | 1635 | 385 | 113 | 0.3 | |
| B | 35 | 440 | 1025 | 345 | 110 | 0.3 | |
| B | 35 | 470 | 820 | 320 | 63 | 0.7 | |
| B | 35 | 500 | 600 | 275 | 29 | 1.0 | |
| B | 52 | 415 | 1240 | 335 | 166 | 0.6 | |
| B | 52 | 440 | 1035 | 315 | 94 | 0.7 | |
| B | 52 | 470 | 875 | 300 | 54 | 1.0 | |
| B | 52 | 500 | 380 | 270 | 44 | 1.7 | |
| B | 78 | 440 | 1085 | 335 | 67 | 0.8 | |
| B | 78 | 470 | 470 | 280 | 34 | 1.2 | MF |
| B | 78 | 500 | 355 | 230 | 27 | 1.5 | |

NOTE:
MF = Melt Fracture
PDC = Poorly Defined Cells

The die gap was found to greatly affect foam cell size and thus, the resulting physical properties of the extruded foamed film. At a given melt temperature, increasing the die gap produced a decrease in the extrusion melt back pressure. The resulting foams had larger cell sizes (as shown in the table below) and lower foam density, thus poorer physical properties. As extrusion melt temperature increases, foam properties also deteriorate (as seen in Example 6). Consequently, increasing polymer melt temperature and increasing die gap both have significant adverse affects on foam physical strength properties.

With respect to MD tensile strength and elongation, the foam film made with the 35 mil gap die exhibits The coextruded multilayer foamed films described above are particularly useful for plastic container closure devices of the type disclosed herein. The coextruded multilayer foamed films of the present invention may also be used for density reduction of typical polyolefin films, as substrates for silicone coated release liners, for decorative applications, packaging, wrapping films, etc.

Having described the invention in detail, what is claimed is:

1. A plastic container closure comprising a threaded or snap-on bottle cap and a liner of a 3-10 mil thick coextruded multilayer foamed film having at least one solid polyolefin film layer and at least one foamed polyolefin layer having an average cell size of less than 0.6 millimeters in length.

2. The plastic container closure of claim 1 wherein said solid polyolefin film layer is a first polyolefin blend containing linear low density polyethylene and low density polyethylene.

3. The plastic container closure of claim 2 wherein said first polyolefin blend comprises about 10-80% linear low density polyethylene, 10-60% low density polyethylene, and 0-50% high density polyethylene.

4. The plastic container closure of claim 3 wherein said foamed polyolefin layer is a second polyolefin blend containing linear low density polyethylene and low density polyethylene.

5. The plastic container closure of claim 4 wherein said second polyolefin blend comprises about 10-90% linear low density polyethylene, 10-90% low density polyethylene, 0-50% ethylene vinyl acetate, and 0-30% high density polyethylene.

6. A plastic container closure comprising a laminate of a 3-10 mil thick coextruded multilayer foamed film having at least one solid polyolefin film layer and at least one foamed polyolefin layer having an average cell size of less than 0.6 millimeters in length, the multilayer foamed film having a first and second surface and an adhesive joining said first surface of said multilayer foamed film to a polyester film and a metallic foil.

7. The plastic container closure of claim 6 further including a polyester film joined to said second surface of said multilayer foamed film with an adhesive.

8. A 3-10 mil thick coextruded multilayer foamed film suitable for use for a plastic container closure, said multilayer foamed film having at least one solid polyolefin film layer and at least one foamed polyolefin layer having an average cell size of less than 0.6 millimeters in length.

9. The multilayer foamed film of claim 8 wherein said solid polyolefin film layer is a first polyolefin blend containing linear low density polyethylene and low density polyethylene.

10. The multilayer foamed film of claim 9 wherein said first polyolefin blend comprises about 10-90% linear low density polyethylene, 10-60% low density polyethylene, and 0-50% high density polyethylene.

11. The multilayer foamed film of claim 10 wherein said foamed polyolefin layer is a second polyolefin blend containing linear low density polyethylene and low density polyethylene.

12. The multilayer foamed film of claim 11 wherein said second polyolefin blend comprises about 10-90% linear low density polyethylene, 10-90% low density polyethylene, 0-50% ethylene vinyl acetate, and 0-30% high density polyethylene.

13. The multilayer foamed film of claim 12 wherein said first polyolefin blend comprises about 10-80% linear low density polyethylene, 10-60% low density polyethylene, and 0-50% high density polyethylene and said second polyolefin blend comprises about 40-75% linear low density polyethylene, 20-60% low density polyethylene, and 2-10% ethylene vinyl acetate.

14. The multilayer foamed film of claim 8 wherein said film is a two-ply one having one solid polyolefin film layer and one foamed polyolefin layer.

15. The multilayer foamed film of claim 14 wherein said solid polyolefin film layer comprises about 10-40% and said foamed polyolefin layer comprises about 90-60% of the total film thickness.

16. The multilayer foamed film of claim 8 wherein said film is a three-ply one having two outer solid polyolefin film layers and a middle foamed polyolefin layer.

17. The multilayer foamed film of claim 16 wherein each of said solid polyolefin film layers comprises about 5-20% and said foamed polyolefin layer comprises about 90-60% of the total film thickness.

* * * * *

UNITED STATES PATENT AND TRADEMARK OFFICE
CERTIFICATE OF CORRECTION

PATENT NO. : 5,000,992
DATED : March 19, 1991
INVENTOR(S) : Robert H. Kelch

It is certified that error appears in the above-identified patent and that said Letters Patent is hereby corrected as shown below:

Column 14, line 4, "10-90%" should correctly appear --10-80%--.

Signed and Sealed this

Seventeenth Day of November, 1992

Attest:

DOUGLAS B. COMER

*Attesting Officer*  *Acting Commissioner of Patents and Trademarks*